(12) United States Patent
Shibata et al.

(10) Patent No.: US 8,645,043 B2
(45) Date of Patent: Feb. 4, 2014

(54) SYSTEM AND METHOD FOR CONTROLLING FUEL INJECTION TO DECREASE PARTICULATE EMISSIONS DURING TRANSIENT ENGINE OPERATION

(75) Inventors: Jonathan T. Shibata, Whitmore Lake, MI (US); Joshua D. Cowgill, Hartland, MI (US); John Ogalla Waldman, Rochester Hills, MI (US); Halim G. Santoso, Novi, MI (US); J. Michael Ellenberger, Huntington Woods, MI (US)

(73) Assignee: GM Global Technology Operations LLC

( * ) Notice: Subject to any disclaimer, the term of this patent is extended or adjusted under 35 U.S.C. 154(b) by 503 days.

(21) Appl. No.: 13/036,282

(22) Filed: Feb. 28, 2011

(65) Prior Publication Data

US 2012/0185151 A1    Jul. 19, 2012

Related U.S. Application Data

(60) Provisional application No. 61/434,138, filed on Jan. 19, 2011.

(51) Int. Cl.
*B60T 7/12* (2006.01)

(52) U.S. Cl.
USPC ............................. 701/103; 701/105

(58) Field of Classification Search
USPC .......... 701/103–105, 110; 123/434, 436, 478, 123/480
See application file for complete search history.

(56) References Cited

U.S. PATENT DOCUMENTS

| | | | | |
|---|---|---|---|---|
| 4,368,705 A | * | 1/1983 | Stevenson et al. | 123/357 |
| 4,596,221 A | * | 6/1986 | Ament et al. | 123/501 |
| 5,878,713 A | * | 3/1999 | Kadota | 123/305 |
| 7,143,755 B2 | * | 12/2006 | Miyauchi et al. | 123/674 |
| 7,661,411 B2 | * | 2/2010 | Kotou et al. | 123/478 |
| 8,539,933 B2 | * | 9/2013 | Cowgill et al. | 123/299 |

\* cited by examiner

*Primary Examiner* — John Kwon

(57) ABSTRACT

A control system for an engine includes a transient operation detection module, an injection determination module, and an injection control module. The transient operation detection module detects whether the engine is operating in a transient state. The injection determination module, based on an elapsed time since a fuel request and at least one of a plurality of engine operating parameters, at least one of (i) increases a number of fuel injections per combustion cycle to N, and (ii) adjusts periods for each of the fuel injections, wherein N is an integer greater than or equal to two. The injection control module controls fuel injection during the transient state based on at least one of (i) N fuel injections per combustion cycle and (ii) the adjusted periods.

20 Claims, 3 Drawing Sheets

SYSTEM AND METHOD FOR CONTROLLING FUEL INJECTION TO DECREASE PARTICULATE EMISSIONS DURING TRANSIENT ENGINE OPERATION

CROSS-REFERENCE TO RELATED APPLICATIONS

This application claims the benefit of U.S. Provisional Application No. 61/434,138, filed on Jan. 19, 2011. The disclosure of the above application is incorporated herein by reference in its entirety.

FIELD

The present disclosure relates to engine control systems and more particularly to a system and method for controlling fuel injection to decrease particulate emissions during transient engine operation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel to create an air/fuel (A/F) mixture. In spark ignition, direct injection (SIDI) engines, fuel injectors inject the fuel directly into the cylinders. The cylinders include pistons that compress the A/F mixture. Spark plugs generate spark to combust the compressed A/F mixture within the cylinders thereby driving the pistons. The movement of the pistons rotatably turns a crankshaft and generates drive torque.

SUMMARY

A control system for an engine includes a transient operation detection module, an injection determination module, and an injection control module. The transient operation detection module detects whether the engine is operating in a transient state. The injection determination module, based on an elapsed time since a fuel request and at least one of a plurality of engine operating parameters, at least one of (i) increases a number of fuel injections per combustion cycle to N, and (ii) adjusts periods for each of the fuel injections, wherein N is an integer greater than or equal to two. The injection control module controls fuel injection during the transient state based on at least one of (i) N fuel injections per combustion cycle and (ii) the adjusted periods.

A method for controlling an engine includes detecting whether the engine is operating in a transient state, based on an elapsed time since a fuel request and at least one of a plurality of engine operating parameters, at least one of (i) increasing a number of fuel injections per combustion cycle to N, and (ii) adjusting periods for each of the fuel injections, wherein N is an integer greater than or equal to two, and controlling fuel injection during the transient state based on at least one of (i) N fuel injections per combustion cycle and (ii) the adjusted periods.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
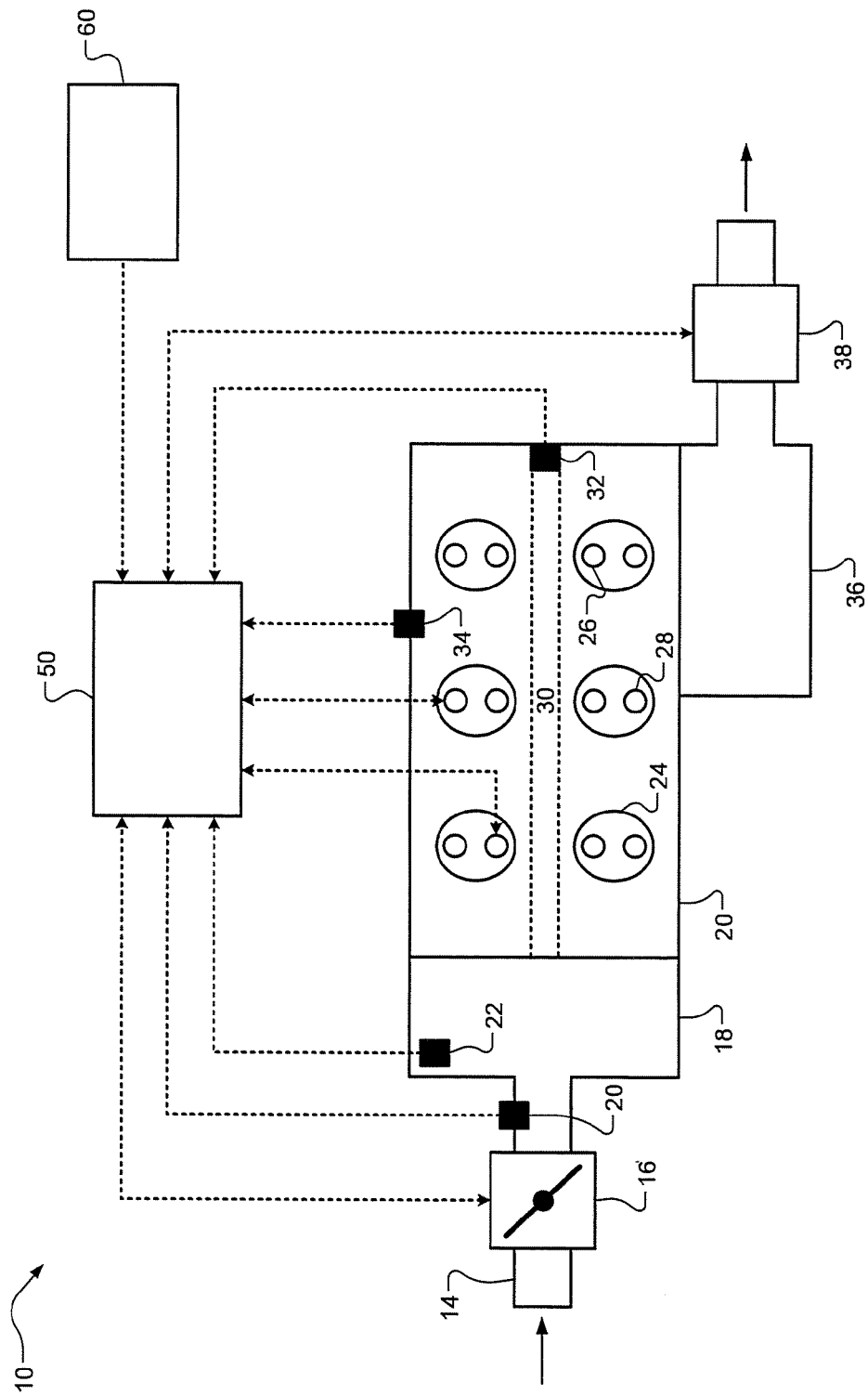
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Spark ignition direct injection (SIDI) engines may perform N fuel injections per combustion cycle (N≥1) to inject a desired amount of fuel. For example, the desired amount of fuel may be based on a fuel request. The number of fuel injection pulses N may vary depending on engine operating conditions. For example, multi-pulse fuel injection (N≥2) may be used in certain situations such as catalyst light-off operations or during knock abatement. Single-pulse fuel injection (N=1), on the other hand, may be used during all other operating conditions (i.e., default operation). An injection period may represent a total period during which the N fuel injections inject the desired amount of fuel. The injection period may be predetermined to maximize fuel economy and/or power during steady-state operation of the engine. Steady-state operation of the engine may include periods when engine mass air flow (MAF) changes less than a predetermined amount during a predetermined period.

Fuel injection based on the predetermined injection period, however, may increase particulate emissions when used during transient operation of the engine (i.e., not steady-state). Transient operation of the engine may include periods when engine MAF changes more than a predetermined amount during a predetermined period. An exhaust treatment system typically treats exhaust gas to remove gaseous emissions before releasing the exhaust gas into the atmosphere. Therefore, particulate matter (PM) filters may be implemented to remove particulates. PM filters, however, increase costs of the exhaust treatment system.

Particulates may be a function of atomization and/or cylinder temperature. Therefore, increasing the number of fuel injections per combustion cycle may decrease particulate emissions. Specifically, increasing the number of fuel injections per combustion cycle may increase combustion efficiency resulting in less unburned fuel and less particulates. For example, the multiple fuel injections may occur sequentially starting at a same start of injection (SOI) time as steady-state operation. SOI timing may be represented by degrees before top dead center (°BTDC). The period of each of the fuel injections may be an equal portion of the predetermined injection period. In addition, however, the period for each of the fuel injections may be adjusted to decrease particulate emissions. For example, an injection split ratio (R) may indicate a ratio of total fuel delivered during each of the fuel injections (e.g., 0.5=50%). For example only, two fuel injections (N=2) per combustion cycle during transient operation is shown in Table 1.

TABLE 1

|  |  | Transient | Steady-State |
|---|---|---|---|
| Start of Injection (SOI) | Injection 1 | 300° BTDC | 300° BTDC |
|  | Injection 2 | 240° BTDC | — |
| Injection Split Ratio (R) | Injection 1 | 0.5 | 1.0 |
|  | Injection 2 | 0.5 | — |

The split ratio for each of the fuel injections may also be different. The sum of the ratios, however, equals one. In other words, the sum of the adjusted periods equals the predetermined injection period. For example, for a four-pulse injection cycle (N=4) the ratios may each be 0.25 (0.25+0.25+0.25+0.25=1.00). Alternatively, for example, during the same four-pulse injection cycle the first three pulses may each have a ratio of 0.30 while the last pulse may have a ratio of 0.10 (0.30+0.30+0.30+0.10=1.00).

Accordingly, a system and method are presented for controlling fuel injection to decrease particulate emissions during transient operation of an engine. The system and method may detect a fuel request and determine a magnitude of the fuel request. For example, the fuel request may be detected after a deceleration fuel cutoff (DFCO) event or when a driver of the vehicle requests more power via a throttle (driver "tip-in" of the throttle). The fuel request, however, may also be detected in other situations. A predetermined injection period may be determined based on the magnitude of the fuel request. For example, the predetermined injection period may be determined using a lookup table that includes predetermined injections periods for steady-state operation of the engine.

After detecting and determining the magnitude of the fuel request, the system and method may determine whether the engine is operating in a transient state. For example only, the transient state may include periods when the MAF has changed more than a predetermined amount during a predetermined period. When the engine is operating in the transient state, the system and method may increase the number of fuel injections N per combustion cycle. Specifically, the system and method may increase the number of fuel injections N per combustion cycle based on an elapsed time since the transient state began and at least one of a plurality of engine operating parameters. For example, the plurality of engine operating parameters may include engine load, engine speed, and engine temperature. The system and method may increase the number of fuel injections N to greater than or equal to two (N≥2) when the engine is operating in single-pulse fuel injection. When the engine is already operating in multi-pulse fuel injection (N≥2), however, the system and method may increase the number of fuel injections to greater than or equal to three (N≥3).

The system and method may also adjust the period of each of the N fuel injections. For example, the period for each of the N fuel injections may be 1/N of the predetermined injection period. The periods for each of the N fuel injections, however, may also be different. Specifically, the periods for each of the N fuel injections may be adjusted based on the elapsed time since the transient state began and at least one of the plurality of engine operating parameters. The sum of the periods, however, equals one. The system and method may then perform fuel injection based on the increased number of fuel injections having the corresponding adjusted periods. For example, the fuel injections may be sequential (i.e., no overlap). The system and method may generate control signals for fuel injectors in the engine. For example, the system and method may generate pulse-width modulated (PWM) control signals for the fuel injectors. When the transient state ends (i.e., when steady-state resumes), the system and method may resume performing N fuel injections, each having a period equal to 1/N of the predetermined period.

Referring now to FIG. 1, an engine system 10 includes an engine 12. For example, the engine 12 may be a SIDI engine. The engine 12 may also be a different type of engine having direct injection such as a homogeneous charge compression ignition (HCCI) engine. Additionally, in some implementations the engine 12 may be part of a hybrid system. The engine 12 draws air into an intake manifold 18 through an induction system 14 that may be regulated by a throttle 16. For example, the throttle 16 may be electrically controlled by electronic throttle control (ETC). A MAF sensor 20 measures a MAF rate into the intake manifold 18. A manifold absolute pressure (MAP) sensor 22 measures a pressure of the air in the intake manifold 18.

The air in the intake manifold 18 may be distributed to a plurality of cylinders 24. The engine 12 may include fewer than or greater than six cylinders as shown. Each of the cylinders 24 may include a fuel injector 26 and a spark plug 28. The fuel injector 26 may inject fuel directly into the cylinder 24 to create an A/F mixture. A piston (not shown) within the cylinder 24 may compress the A/F mixture and the spark plug 28 may ignite the compressed A/F mixture. The combustion of the A/F mixture drives the piston (not shown) which rotatably turns a crankshaft 30 generating drive torque. An engine speed sensor 32 measures a rotational speed of the crankshaft 30 ("engine speed"). For example, the engine speed sensor 32 may measure the engine speed in revolutions per minute (RPM).

An engine temperature sensor 34 measures a temperature of the engine 12. For example, the engine temperature sensor 34 may measure a temperature of engine coolant. Exhaust gas resulting from combustion of the NF mixture is expelled from the cylinders 24 into an exhaust manifold 36. An exhaust treatment system 38 treats the exhaust gas in the exhaust manifold 36. Specifically, the exhaust treatment system 38 decreases gaseous emissions before releasing the exhaust gas into the atmosphere. For example only, the exhaust treatment system 38 may include a three-way catalytic converter. The exhaust treatment system 38, however, may not include a PM filter to maintain lower costs of the exhaust treatment system 38.

A control module 50 controls the engine system 10. The control module 50 receives signals from the throttle 16, the MAF sensor 20, the MAP sensor 22, the fuel injectors 26, the spark plugs 28, the engine speed sensor 32, the engine temperature sensor 34, and/or the exhaust treatment system 38. The control module 50 controls the throttle 16, the fuel injectors 26, the spark plugs 28, and/or the exhaust treatment system 38. The control module 50 may also implement the system or method of the present disclosure.

Figure 2:
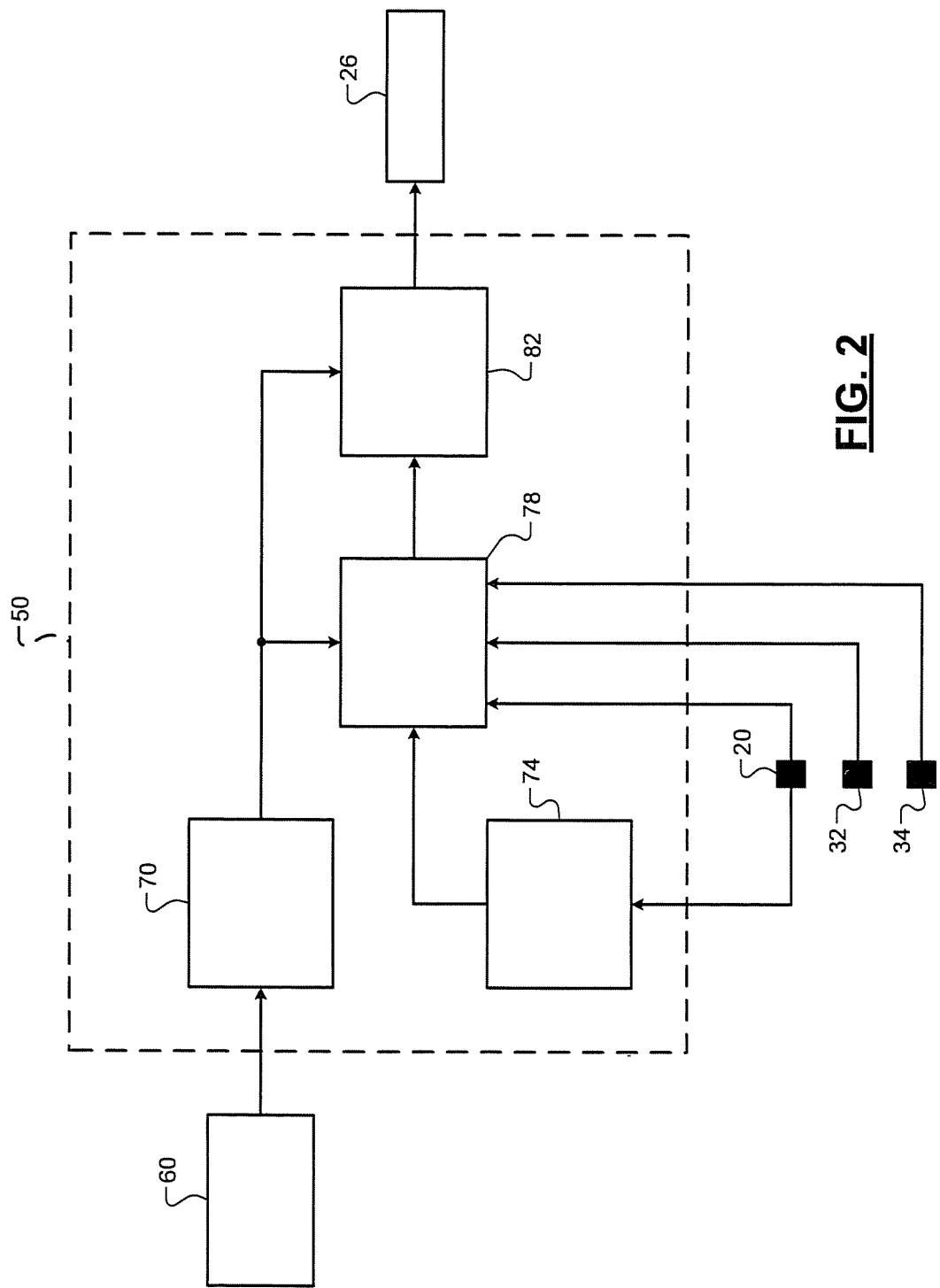
FIG. 2 is a functional block diagram of an example control module according to one implementation of the present disclosure.

Referring now to FIG. 2, the control module 50 includes a fuel request detection module 70, a transient operation detection module 74, an injection determination module 78, and an injection control module 86.

The fuel request detection module 70 detects a fuel request based on driver input 60. Specifically, the fuel request may be detected based on a magnitude of driver input 60. For example, the fuel request may occur after a DFCO event or in response to a driver tip-in of the throttle 16. The fuel request detection module 70, however, may also detect the fuel request in other situations. The fuel request detection module 70 may also initialize and start a timer when the fuel request is detected. The timer may represent an elapsed time since detection of the fuel request.

The transient operation detection module 74 detects when the engine 12 is operating in the transient state. For example, the transient operation detection module 74 may detect that the engine 12 is operating in the transient state when the MAF rate into the engine 12 has changed more than a predetermined amount during a predetermined period. The transient operation detection module 74, however, may also detect transient operation of the engine 12 based on other engine operating parameters. When transient operation is detected, the transient operation detection module 74 may generate a signal for the injection determination module 78. Similarly, when transient operation ends the transient operation detection module 74 may notify the injection determination module 78. For example, the transient operation detection module 74 may generate another signal for the injection determination module 78.

The injection determination module 78 receives the signal indicating transient operation. The injection determination module 78 also receives the elapsed time since detection of the fuel request from the fuel request detection module 70. The injection determination module 78 may also receive signals indicating plurality of engine operating parameters. For example, the injection determination module 78 may receive signals from the MAF sensor 20, the engine speed sensor 32, and the engine coolant temperature sensor 34 indicating engine load, engine speed, and engine temperature, respectively.

The injection determination module 78 determines whether to increase a number of fuel injections per combustion cycle to N (N≥2). The engine 12 may have been previously operating in single-pulse injection mode (e.g., default operation) or in multi-pulse injection mode (e.g., during catalyst light-off operations or knock abatement). Therefore, the injection determination module 78 may increase the number of fuel injections to N≥2 when previously operating in single-pulse injection mode (i.e., transition to multi-injection mode. Similarly, the injection determination module 78 may increase the number of fuel injections to N≥3 during multi-pulse injection mode (or a larger N depending on the previous number of injections during the multi-pulse injection mode). Specifically, the number of fuel injections may be selectively increased as engine load increases, as engine speed increases, and/or as engine temperature decreases.

Additionally or alternatively, the injection determination module 78 may adjust periods for the fuel injections. As previously described, the engine 12 may have been previously operating in single-pulse injection mode or in multi-pulse injection mode. For example, during single-pulse injection the period is the predetermined injection period. Additionally, for example, during multi-pulse injection the period is an equal portion of the predetermined injection period (e.g., 2 injections each having ½ the predetermined injection period). Specifically, the injection determination module 78 may adjust these periods for the fuel injections. The sum of the adjusted periods, however, equals one.

The injection control module 82 may then control fuel injection. The injection control module 82 may control fuel injection during transient operation based on at least one of (i) N fuel injections and (ii) the adjusted periods. During steady-state operation, on the other hand, the injection control module 82 may control fuel injection based on single-pulse having the predetermined injection period or multi-pulse fuel injection each having an equal portion of the predetermined injection period. The injection control module 82 may generate control signals to actuate the fuel injectors 26. For example, the control signals may include PWM signals. The control signals, however, may also be other suitable types of fuel injector control signals.

Figure 3:
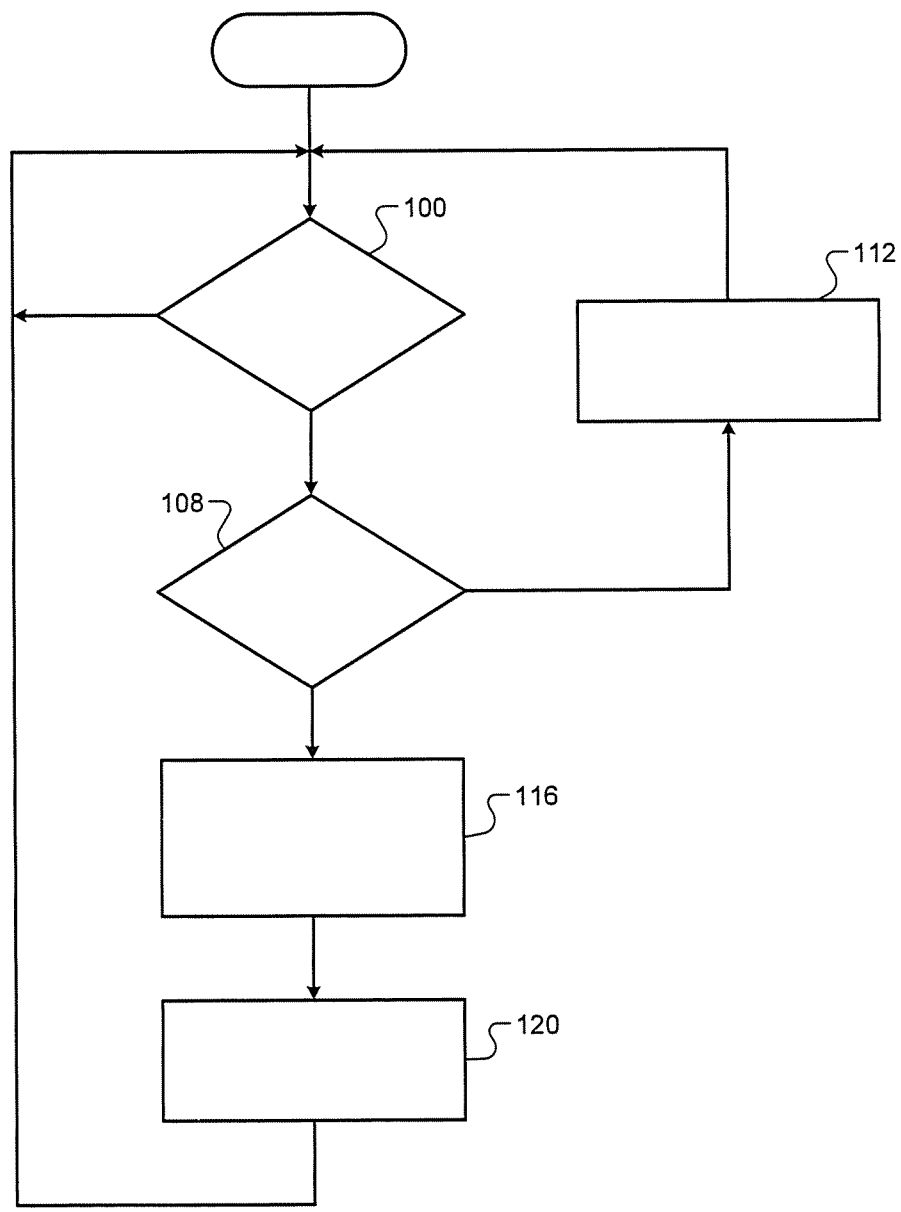
FIG. 3 is a flow diagram illustrating steps of an example method for controlling fuel injection to decrease particulate emissions according to one implementation of the present disclosure.

Referring now to FIG. 3, a method for adjusting fuel injection timing to decrease particulate emissions during transient operation of an engine begins at 100. At 100, control detects whether fueling is requested. If true, control may proceed to 104. If false, control may return to 100. At 104, control determines whether the engine is operating in a transient state. If false, control may proceed to 108. If true, control may proceed to 112. At 108, control may control may perform fuel injection for steady-state operation. For example, control may perform single-pulse fuel injection having the predetermined period. Alternatively, for example, control may perform multi-pulse fuel injection (e.g., during catalyst light-off operations or knock abatement) using the predetermined period (i.e., equal portions of the predetermined period per injection pulse. Control may then return to 100.

At 112, control may, based on the elapsed time since detection of the fuel request and at least one of the plurality of engine operating parameters, at least one of (i) increase the number of fuel injections per combustion cycle to N (N≥2) and (ii) adjusted periods for the fuel injections. At 116, control may control may perform fuel injection based on at least one of (i) N fuel injections and (ii) the adjusted periods.

Control may then return on the determined number of fuel injections N. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
   a transient operation detection module that detects whether the engine is operating in a transient state;
   an injection determination module that, based on an elapsed time since a fuel request and at least one of a plurality of engine operating parameters, at least one of (i) increases a number of fuel injections per combustion cycle to N, and (ii) adjusts periods for each of the fuel injections, wherein N is an integer greater than or equal to two; and
   an injection control module that controls fuel injection during the transient state based on at least one of (i) N fuel injections per combustion cycle and (ii) the adjusted periods.

2. The control system of claim 1, wherein the plurality of engine operating parameters include engine load, engine speed, and engine temperature.

3. The control system of claim 2, wherein the injection determination module selectively increases the number of fuel injections per combustion cycle as engine load increases.

4. The control system of claim 2, wherein the injection determination module selectively increases the number of fuel injections per combustion cycle as engine speed increases.

5. The control system of claim 2, wherein the injection determination module selectively increases the number of fuel injections per combustion cycle as engine temperature decreases.

6. The control system of claim 1, wherein each of the periods is an equal portion of a predetermined injection period, and wherein the predetermined injection period corresponds to steady-state operation of the engine.

7. The control system of claim 6, wherein a sum of the adjusted periods equals the predetermined injection period.

8. The control system of claim 6, wherein the steady-state operation includes periods when mass air flow (MAF) into the engine has changed less than a predetermined amount during a predetermined period.

9. The control system of claim 8, wherein the transient state includes periods when MAF into the engine has changed more than the predetermined amount during the predetermined period.

10. The control system of claim 9, wherein the fuel request is in response to one of a driver tip-in of a throttle and an end of a deceleration fuel cutoff (DFCO) event.

11. A method for controlling an engine, comprising:
    detecting whether the engine is operating in a transient state;
    based on an elapsed time since a fuel request and at least one of a plurality of engine operating parameters, at least one of (i) increasing a number of fuel injections per combustion cycle to N, and (ii) adjusting periods for each of the fuel injections, wherein N is an integer greater than or equal to two; and
    controlling fuel injection during the transient state based on at least one of (i) N fuel injections per combustion cycle and (ii) the adjusted periods.

12. The method of claim 11, wherein the plurality of engine operating parameters include engine load, engine speed, and engine temperature.

13. The method of claim 12, further comprising selectively increasing the number of fuel injections per combustion cycle as engine load increases.

14. The method of claim 12, further comprising selectively increasing the number of fuel injections per combustion cycle as engine speed increases.

15. The method of claim 12, further comprising selectively increasing the number of fuel injections per combustion cycle as engine temperature decreases.

16. The method of claim 11, wherein each of the periods is an equal portion of a predetermined injection period, and wherein the predetermined injection period corresponds to steady-state operation of the engine.

17. The method of claim 16, wherein a sum of the adjusted periods equals the predetermined injection period.

18. The method of claim 16, wherein the steady-state operation includes periods when mass air flow (MAF) into the engine has changed less than a predetermined amount during a predetermined period.

19. The method of claim 18, wherein the transient state includes periods when MAF into the engine has changed more than the predetermined amount during the predetermined period.

20. The method of claim 19, wherein the fuel request is in response to one of a driver tip-in of a throttle and an end of a deceleration fuel cutoff (DFCO) event.

\* \* \* \* \*